(No Model.)
S. H. PURDY.
GRAIN SEEDER.
No. 429,954. Patented June 10, 1890.
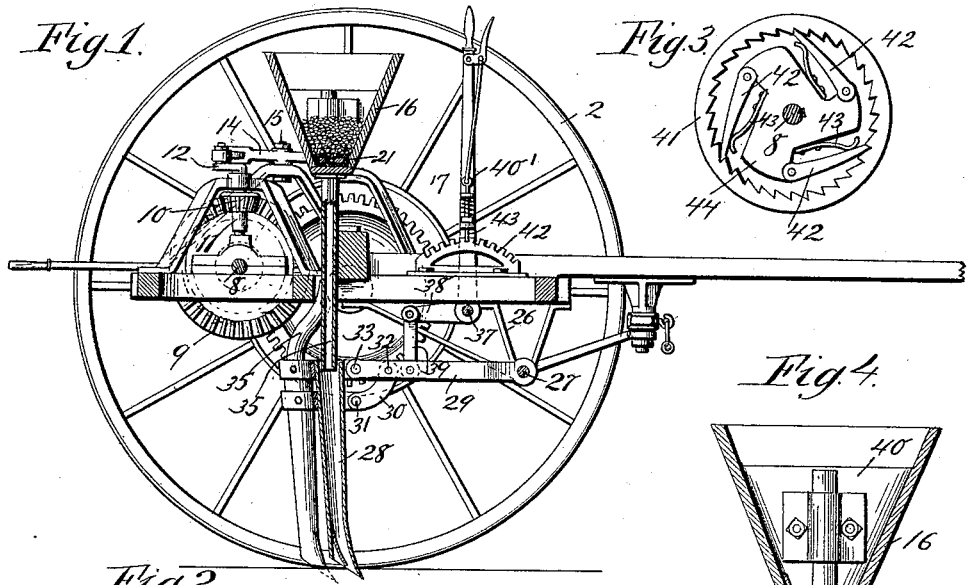
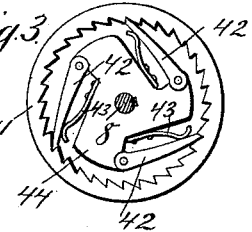
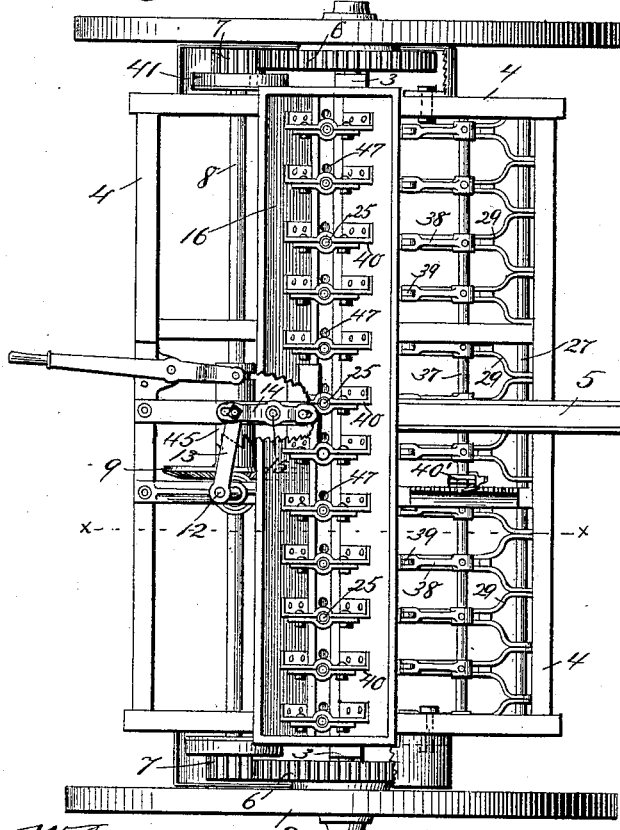
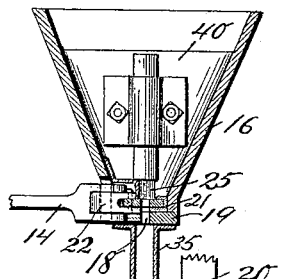
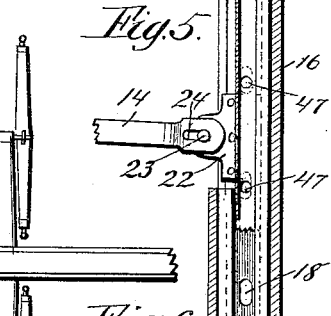
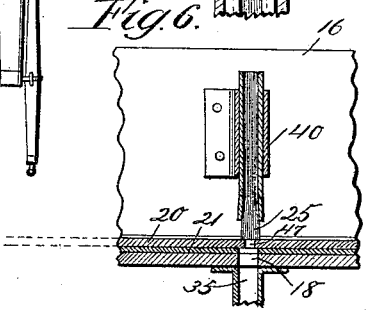
Witnesses
J. Jessen
A. M. Gaskill
Inventor:
Stillman H. Purdy.
By Paul & Merwin attys.

UNITED STATES PATENT OFFICE.

STILLMAN H. PURDY, OF MINNEAPOLIS, MINNESOTA.

GRAIN-SEEDER.

SPECIFICATION forming part of Letters Patent No. 429,954, dated June 10, 1890.

Application filed December 30, 1889. Serial No. 335,386. (No model.)

*To all whom it may concern:*

Be it known that I, STILLMAN H. PURDY, of Minneapolis, in the county of Hennepin and State of Minnesota, have invented certain Improvements in Grain-Seeders, of which the following is a specification.

My invention relates to that class of machines employed in the sowing or planting of small grain, whereby the grain is scattered over the ground or deposited in furrows and covered therein.

The invention is adapted to be used in sowing or planting any of the smaller kerneled cereals, but especially wheat, and is designed to uniformly distribute the grain over the ground to be seeded, instead of scattering it at random or bunching it in a row, whereby each kernel of grain may be given the necessary surrounding earth for its proper nourishment, and perfect germination is thereby secured.

In the accompanying drawings, forming a part of this specification, Figure 1 is a vertical section on line $x$ $x$ of Fig. 2. Fig. 2 is a plan view of my improved grain-seeder with portions broken away, showing the connection with the sliding feed plate or shuttle and also the gear attachment near the main wheels. Fig. 3 is a detail showing the manner of attaching to main wheels. Fig. 4 is a vertical section of the hopper and its interior mechanism. Fig. 5 is a partial longitudinal horizontal section of the hopper, showing the sliding feed-plate and its connections. Fig. 6 is a detail showing the brush in position when the grain is being dropped.

In the drawings, 2 represents the wheels of my improved seeder, which support by means of axles 3 the frame 4. A tongue 5 is secured to this frame for draft purposes. The wheels 2 are provided with suitable driving-gear 6, meshing with the spur-gears 7, having the enlarged ratchet-wheel 41 formed integrally therewith and supported loosely upon the shaft 8. The spring-controlled pawls 42 and spring 43 are secured to the casting 44, which is secured to the shaft 8 in such manner as to bring the pawls 42 in engagement with the notches of the ratchet-wheel 41 when it is carried forward, thereby causing the shaft 8 to revolve, the shaft 8 being supported upon the frame within suitable bearings secured to said frame. A bevel gear-wheel 9, loosely pinioned on the shaft 8 near its center, meshes with a bevel-gear 10, secured upon a shaft 11, having bearings in the frame 4. The bevel-gear 9 is adapted to be thrown in and out of gear by means of the sliding clutch 45, sliding on a feather of the shaft 8. The upper end of the shaft 11 is provided with a bell-crank 12, to which is pivotally secured one end of the arm 13, the other end being pivotally secured to one end of the pivoted lever 14, which is secured in place by the pivot or stud 15, secured to the frame 4. The other end of the pivoted lever 14 is bifurcated, and each branch is provided with a slot 24. A hopper 16, supported above the frame 4 by means of the standards 17, secured to said frame, is provided with a bottom 19, having a series of elongated holes 18 through it. A sliding metal feed-plate 20 is arranged to slide within a stationary metal guiding-plate 21, secured within said hopper and to the bottom 19. The stationary plate is provided with a series of holes similar to and registering with the holes 18 in the bottom 19, and has inwardly-turned flanges at the top, as shown in Figs. 4 and 5, to hold the sliding plate 20 in place. The sliding plate 20 is provided with a similarly-arranged series of circular holes or perforations 47, of a size somewhat larger than a kernel of the grain to be sown, but permitting but one of said kernels to lie within it at a time. A casting 22 of suitable strength is secured to the plate 20 and provided with the bolt 23, adapted to fit in the slots 24 of the lever 14. Within the hopper and directly over each hole in the bottom thereof is arranged a brush 25, secured to the sides of the hopper by the frame 40. Beneath the frame 4, and secured to it by the hangers 26, is the cross-shaft 27, loosely journaled in the said hangers 26. Upon the shaft 27 are hinged hollow drag-teeth 28, by means of the arms 29, pivoted thereto by the pivot 33, having the other end provided with holes permitting them to slide upon the shaft 27. The releasing-stay 30 is connected to the teeth 28 by the bolts 31, and to the arms 29 by the wooden pins 32, thereby making the teeth rigid with the arms and affording an easy means of releasing the teeth without injury thereto in case an obstacle is met which otherwise would break them by breaking the wooden peg. A flexible connecting-pipe 35 is attached to the bottom of the hopper registering with the holes therein and extending down into the hollow teeth 28. A shaft 37, extending over said arms 29 and secured to the frame 4 in suitable bearings, is provided with a series of rearwardly-projecting arms 38. These arms are connected to the arms 29 by the links 39. A lever 40' is secured to the shaft 37, whereby it may be made to rotate in its bearings, carrying with it the arms 38, and depressing or raising the arms 29, causing the drag-teeth to be similarly raised or depressed. A segmental casting 42, having notches in its periphery, is secured to the frame adapted to engage with a spring-catch 43, attached to the lever 40, whereby the same may be locked in any desired position.

The operation of my device is as follows: The hopper being provided with grain and the clutch 45 thrown in gear, as the machine is moved forward the wheels 2, carrying the driving-gear 6, are carried forward, propelling the gear 7. The ratchet-wheel, engaging the pawls 42, carries the casting 44 and with it the shaft 8, which, through the clutch 45, propels the bevel-gear 9 and 10, rotating the crank 12, which, through the arm 13 and the pivoted lever 14, causes the sliding plate 20 to reciprocate within the guiding-plate 21, alternately bringing the holes in said sliding plate 20 in contact with the grain in the hopper to be filled with the grain, and under the brush 25, so as to register with the slotted openings in the plate 21 and bottom 19, allowing the grain carried in said holes to be dropped into the flexible tube 35 and through the hollow drag-teeth 28 into the furrow made in the soil by said teeth, where they are perfectly covered as soon as the teeth have passed far enough to allow the earth to return to the furrow made by them. By throwing the clutch away from and out of mesh with the bevel-gears 9 the sliding plate 20 is stopped in its operation and the machine will not deposit any grain. When it is desired to plant the grain deeper, the lever 40' is drawn back, so that the spring-catch 43 will engage one or more notches farther back on the segment 42, and the lever 40 will then hold the teeth 28 to the depth required, and the depth they plow the furrow being the guide to the depth the grain is planted a perfect regulation thereof is obtained.

The plates 20 and 21 may be readily removed and others put in their places having a series of holes of such sizes as will correspond with the grain desired to be sown. The brush 25 is used in a double capacity. Being secured directly over the larger holes in the plate 21 and bottom 19, it prevents the grain from falling through them when the sliding plate is so placed that its holes register therewith. The throw of the sliding plate 20 is sufficient to carry the holes in it outside of the brush and free to receive the grain in them. The brush during the return throw of the sliding plate sweeps off all the kernels of grain which have not fallen entirely into the receptacle formed by the holes in the plate 20 and the plate 21, thereby causing the grain to be free from chaff or other obstructions, so that it will readily fall out of the plate 20 through the flexible tube 35 and hollow tooth 28 into the ground.

I claim—

1. In a grain-seeder, the combination, with the hopper having the elongated holes 18 in its bottom, of the stationary guide-plate 21, having perforations over holes 18, the reciprocating plate 20, having perforations registering with the holes in the bottom of the hopper, the pivoted arm 14, having an elongated slot 24 in its end through which passes the pin 23, connected with the sliding plate 20, a shaft 11, having a crank-arm connected with the pivoted arm 14, and provided with a gear 10, and a clutch for bringing said gear into and out of action, substantially as and for the purposes set forth.

2. The combination, with the hopper having elongated holes 18 in its bottom, and a reciprocating plate 20, having perforations registering with those in the hopper-bottom, of the frames 40, secured to the sides of the hopper, and having the brushes 25 clamped thereto over the elongated openings in the bottom of the hopper, substantially as and for the purposes set forth.

In testimony whereof I have hereunto set my hand this 14th day of December, 1889.

STILLMAN H. PURDY.

In presence of—
  S. W. ROBERTS,
  A. C. PAUL.